United States Patent Office 2,866,814
Patented Dec. 30, 1958

2,866,814

TRIETHYLAMINE SALTS OF N-(NAPHTHYL)-DITHIOCARBAMIC ACIDS

Bryant C. Fischback, Walnut Creek, and Guy H. Harris, Concord, Calif., assignors to The Dow Chemical Company, Midland, Mich., a corporation of Delaware No Drawing. Application October 28, 1955
Serial No. 543,613

2 Claims. (Cl. 260—501)

The present invention is concerned with the triethylamine salts of N-(naphthyl)-dithiocarbamic acids of the formula

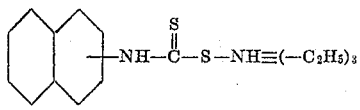

These compounds are crystalline solids which are somewhat soluble in many organic solvents and of low solubility in water. The new compounds are useful as intermediates for the preparation of N-(naphthyl)-isothiocyanates in excellent yield. In such use, substantially equimolecular proportions of a triethylamine salt of N-(naphthyl)-dithiocarbamic acid, sodium hydroxide and lead nitrate are mixed and blended together in water at temperatures of from 20° to 45° C. Following the reaction, the reaction mixture is steam distilled to separate the isothiocyanate as a crystalline solid. The new trialkyl amine salts of the N-(naphthyl)-dithiocarbamic acids are also useful as parasiticides and adapted to be employed as active toxic constituents of compositions for the control of insects, bacteria and fungi such as *Rhizoctonia solani* and Fusarium spp. For such use, the compounds may be employed as constituents of solvent solutions and aqueous dispersions or emulsions, or in mixture with inert finely divided powders.

The new compounds may be prepared by reacting together (a) 1-naphthylamine or 2-napthylamine, (b) carbon disulfide and (c) triethylamine. The reaction conveniently is carried out in an inert organic solvent in which the desired triethyl ammonium N-(naphthyl)-dithiocarbamate is insoluble, and preferably in a low boiling solvent such as diethyl ether, diisopropyl ether or n-pentane. Good results are obtained when substantially equimolecular proportions of the reactants are employed. In a preferred operation, optimum yields are obtained when employing small excesses in the amount of ten percent each of the triethylamine and carbon disulfide reagents.

In the foregoing method, the triethylamine and naphthylamine may be dispersed in the reaction solvent and the carbon disulfide added portionwise thereto. In an alternative procedure, the triethylamine, naphthylamine and carbon disulfide are combined and blended together in the reaction solvent. The reaction is somewhat exothermic and takes place smoothly at temperatures of from 20° to 65° C. The temperature may be controlled by the addition or substraction of heat as may be required. In a convenient method of operation, the reaction is carried out at the boiling temperature of the reaction mixture and under reflux. During the reaction, the desired product separates and solidifies in the reaction mixture as a crystalline solid. The latter may be separated by filtration and thereafter purified by conventional methods.

In a representative operation, 143.2 grams (1 mole) of 2-naphthylamine and 111.3 grams (1.1 moles) of triethylamine were dispersed in 1.5 liters of diisopropyl ether. This mixture was then heated to 60° C. and 83.8 grams (1.1 moles) of carbon disulfide added thereto with stirring. Stirring was thereafter continued, and the mixture maintained at 60° C. for two hours and then at 45° C. for about 20 hours to complete the reaction. Following the reaction, the mixture was filtered to separate a triethyl ammonium N-(2-naphthyl)-dithiocarbamate product in a yield of 76.3 percent. The product contained sulfur and nitrogen contents of 19.9 and 8.6 percent, respectively, as compared to theoretical contents of 20 and 8.7 percent.

In a further operation, 1 mole of 1-naphthylamine and 1.1 moles of triethylamine are dispersed in 1.5 liters of diisopropyl ether and 1.1 moles of carbon disulfide added thereto with stirring and at a temperature of 50° C. Stirring is thereafter continued and the mixture maintained at a temperature of 50° C. for two hours and then at 40° C. for 15 hours to complete the reaction. The mixture is then cooled to room temperature and filtered to separate a triethyl ammonium N-(1-naphthyl)-dithiocarbamate product as a crystalline residue.

We claim:

1. A compound selected from the group consisting of triethyl ammonium N-(1-naphthyl)-dithiocarbamate and triethyl ammonium N-(2-naphthyl)-dithiocarbamate.

2. Triethyl ammonium N-(2-naphthyl)-dithiocarbamate.

References Cited in the file of this patent

UNITED STATES PATENTS

| | | |
|---|---|---|
| 1,972,961 | Tisdale | Sept. 11, 1934 |
| 2,457,674 | Hueberger | Dec. 28, 1948 |

FOREIGN PATENTS

| | | |
|---|---|---|
| 541,048 | Great Britain | Nov. 11, 1941 |

OTHER REFERENCES

Losanitsch: Ber., vol. 40, 2977 (1907).
Potts: Chem. Abs., vol. 38, 2398 (1944).
Chabrier: Bull. Chim. Soc. (France), 1950, p. D60.